United States Patent Office 3,521,899
Patented July 28, 1970

3,521,899
FRONT WHEEL MOUNTING FOR HEAVY ROAD VEHICLES
Robert Frederick Whitehead, 56 Boundary Road, Chester Hill, near Sydney, New South Wales, Australia
Filed May 22, 1968, Ser. No. 731,199
Claims priority, application Australia, May 22, 1967, 22,104/67
Int. Cl. B62d 7/02
U.S. Cl. 280—81.5     20 Claims

ABSTRACT OF THE DISCLOSURE

The invention relates to the steering of the front wheels of heavy vehicles having two axle beams mounting the wheel stub axles. The location of the steering mechanism relative to the intermediate trunnion permits maximum stability of the front wheel assemblies when travelling over irregularities of the ground surface.

---

Figure 1:
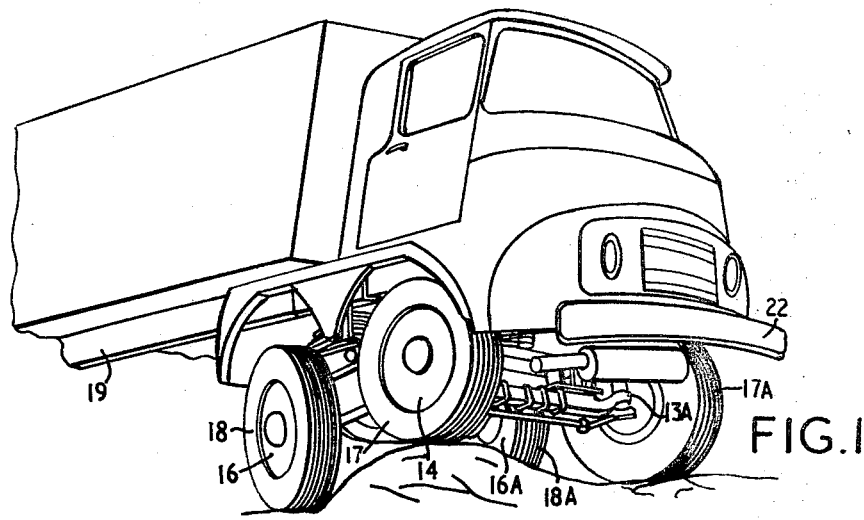

This invention has reference to heavy vehicles, particularly heavy trucks, semi-trailers, tipping trailers and the like. In the following description the word "vehicle" will be used, for the sake of simplicity, to represent any type of heavy road vehicle mentioned above, as well as any other heavy vehicle to which the present invention is applicable.

The object of the invention is to provide such a construction of the vehicle front wheels and, more particularly, of their connection with, or mounting to, the frame or chassis of the vehicle, that the latter can travel easily over very rough ground which cannot normally be negotiated by such vehicles, and that the vehicle can readily be manuevered out of precarious positions, for instance if the vehicle must be turned round on a narrow, or comparatively narrow, road bordered by embankments and/or ditches, mounds, holes or other irregularities of the ground surface, with the front wheels or at least some of the front wheels remaining on the ground.

Expressed in different terms, the object of the invention is thus an arrangement on, or a mounting of the front wheels to, the forward portion of the vehicle—which may be the part carrying the driver's cabin—such that the position of each front wheel can be varied within a comparatively wide range relative to the other wheels and relative to the vehicle frame or chassis, independently of the position of said other wheels.

The fulfillment of this object also makes it necessary to connect the wheels to the vehicle steering mechanism in such a manner that the steering operation can be carried out effectively, and without endangering the steering mechanism and its connection with the front wheels, in any of the mutual positions of the front wheels, which they can assume during their travel over rough ground or during maneuvering operations of the type referred to above.

According to the invention, the front portion of the vehicle—which in most cases carries the driver's cabin—is connected with a bogie structure by means of a dead suspension axle or trunnion which is firmly retained in mountings provided at opposite sides of the forward portion of the vehicle chassis or frame.

The bogie structure comprises, in addition to the above-mentioned suspension axle or trunnion, two wheel axles, viz. a leading and a trailing axle beam arranged, respectively, in front of and behind the trunnion—the terms "in front of" and "behind" being related to the direction of normal vehicle travel. During straight forward (or rearward) travel on an even road surface, the leading axle beam, which by means of stub axles carries the leading bogie wheels, and the trailing axle beam which likewise by stub axles carries the rear or trailing bogie wheels, extend both parallel to the trunnion, preferably at a level slightly below that of the trunnion. The two axle beams, which are yieldingly connected with the trunnion in a manner described hereafter, are resiliently held in their respective positions relative to the trunnion by springs, preferably sets of leaf springs. These are mounted on hubs retained on, but rotatable about the opposite extremities of the trunnion. The free ends of the springs are not connected either to the leading or to the trailing axle beam but are arranged to slidingly engage the axle beams from above, either directly or indirectly.

The connection of the trunnion with the leading and with the trailing axle beams is effected by means of a number of torque rods or equivalent resilient members so arranged that the two axles are capable—independently of each other—of a limited displacement relative to the front portion of the vehicle chassis during the vehicle motion, such as may be caused by irregularities of the surface on which the vehicle travels or over which it is maneuvered, so that the bogie wheels can be said to "walk" over these irregularities even though such irregularities be larger than any that can normally be overcome by heavily loaded trucks or like vehicles under their own power.

For connecting the trunnion with the two axle beams, at least six torque rods or equivalent members are used, all six rods having the same operative length. Two of these rods interconnect the middle of the trunnion with the middle of the leading axle beam and of the trailing axle beam, respectively.

Two further torque rods extend between separate points of the trunnion and points near the opposite ends of the leading axle beam, and the remaining two rods from separate points of the trunnion to points near the opposite ends of the trailing axle beam. The connection of all torque rods to the trunnion and to the axles, respectively, is effected by pins supported by pairs of lugs mounted on the trunnion and on the axle beams, respectively, via shackle bolts, or via rubber or like resilient bushes, the type of the bush selected depending on the stresses to which the connections are likely to be subjected at the respective joints.

The middle portions of the sets of springs are rigidly connected by appropriate means with hubs which are provided on the opposite extremities of the trunnion and are capable of rotation through an angle about the trunnion axis. The free end portions of the springs bear upon the opposite end portions of the leading and of the trailing axle beam, respectively, and are displaceable thereon in response to changes of the load the springs have to take at any time. Upright elements, such as spaced pairs of lugs, or equivalent means guard against excessive displacement of the spring end portions on the axles in the direction of the longitudinal axes of the axle beams.

When the vehicle stands, or travels on level ground and the load on the bogie is symmetrically distributed relative to the longitudinal vehicle axis, the bogie, i.e. the assembly which includes the trunnion, the leading and trailing axle beams, the torque rods and the springs, constitutes a symmetrical system which, however, due to the resiliency of its parts and their interconnection is capable of a limited distortion in practically any direction when subjected to varying stresses, particularly those imparted to it by changes in the configuration of the ground over which the vehicle is made to travel. The stresses which the bogie structure can take are much heavier than those negotiable by other known arrangements for the purpose set forth.

As summed up above, the system resembles to some extent that described in patent specification No. 3,313,369 which has reference to a four-wheel bogie for the support of the rear of heavy vehicles with six or more than six wheels. However, as the present construction is concerned with the front wheels of the vehicle and their mounting, care must be taken to enable the two pairs of front wheels mounted as stated above, to be and to remain steerable under the stresses to which the vehicle may be subjected during travel over extremely rough road and other surfaces, or when manoeuvering it under extremely severe conditions.

The steering of the wheels on each of the two axle beams is effected, by one of two steering arms connected, respectively, with one of the stub axles on each beam, the steering movement imparted to the steering arm on each axle beam being transmitted to the second stub axle on the same axle beam, in a manner known per se, by a track-rod which interconnects the track-arms of the stub-axles for the wheels on the respective axle beam. The two steering arms are each connected via intermediate gearing to the drop arm, or to an equivalent element of the vehicle steering mechanism.

The intermediate gearing referred to above comprises two substantially parallel swing arms which are each pivotably supported by one of two bearings supported on the vehicle chassis—or on some part connected therewith—at the side of the vehicle at which the aforementioned steering arms are arranged, the swing arms being each connected by a drag link with the steering arm for the stub axle nearer to the respective swing arm.

The two swing arms are interconnected by a link which, depending on the required turning circle of the vehicle, may either be parallel to a plane determined by the swinging axes of said swing arms, or may be inclined to that plane at a selected angle. One of the two swing arms is connected by a connecting rod with the drop arm or equivalent of the steering mechanism. The drag links which connect the swing arms of the intermediate gearing with the track rods and/or stub axles have the same operative length as the above described torque rods.

The combination according to this invention, of the system comprising the axle beams, the intermediate trunnion which resiliently carries the vehicle chassis and of the torque rods, with the abovementioned mechanism for the transfer of the steering forces via said intermediate gearing ensures a maximum stability of the front wheel assembly under most difficult travelling conditions even for heaviest loads, while preserving full operability of the steering mechanism, without undue stress on the latter, irrespective of the mutual position of the two axle beams carrying the front wheels.

Figure 2:
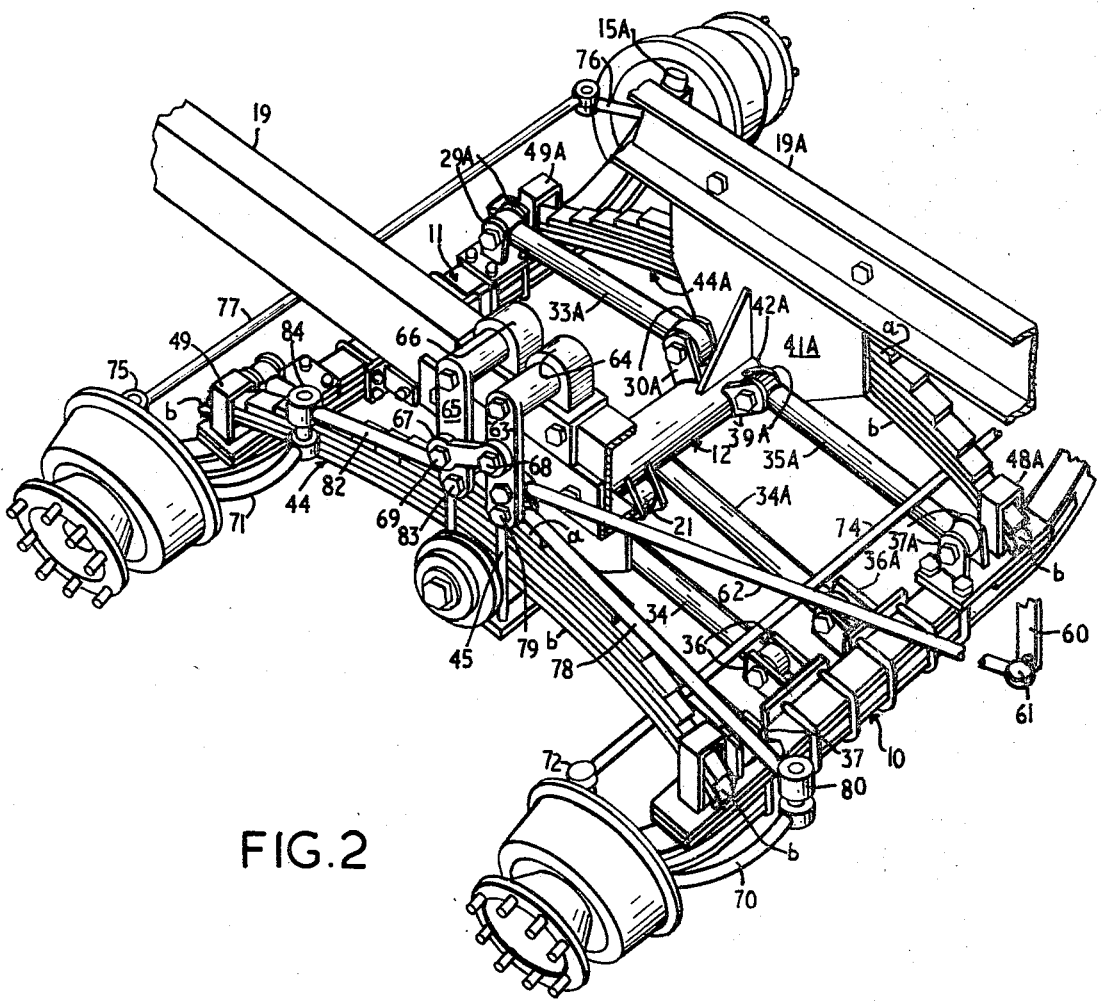
Figure 3:
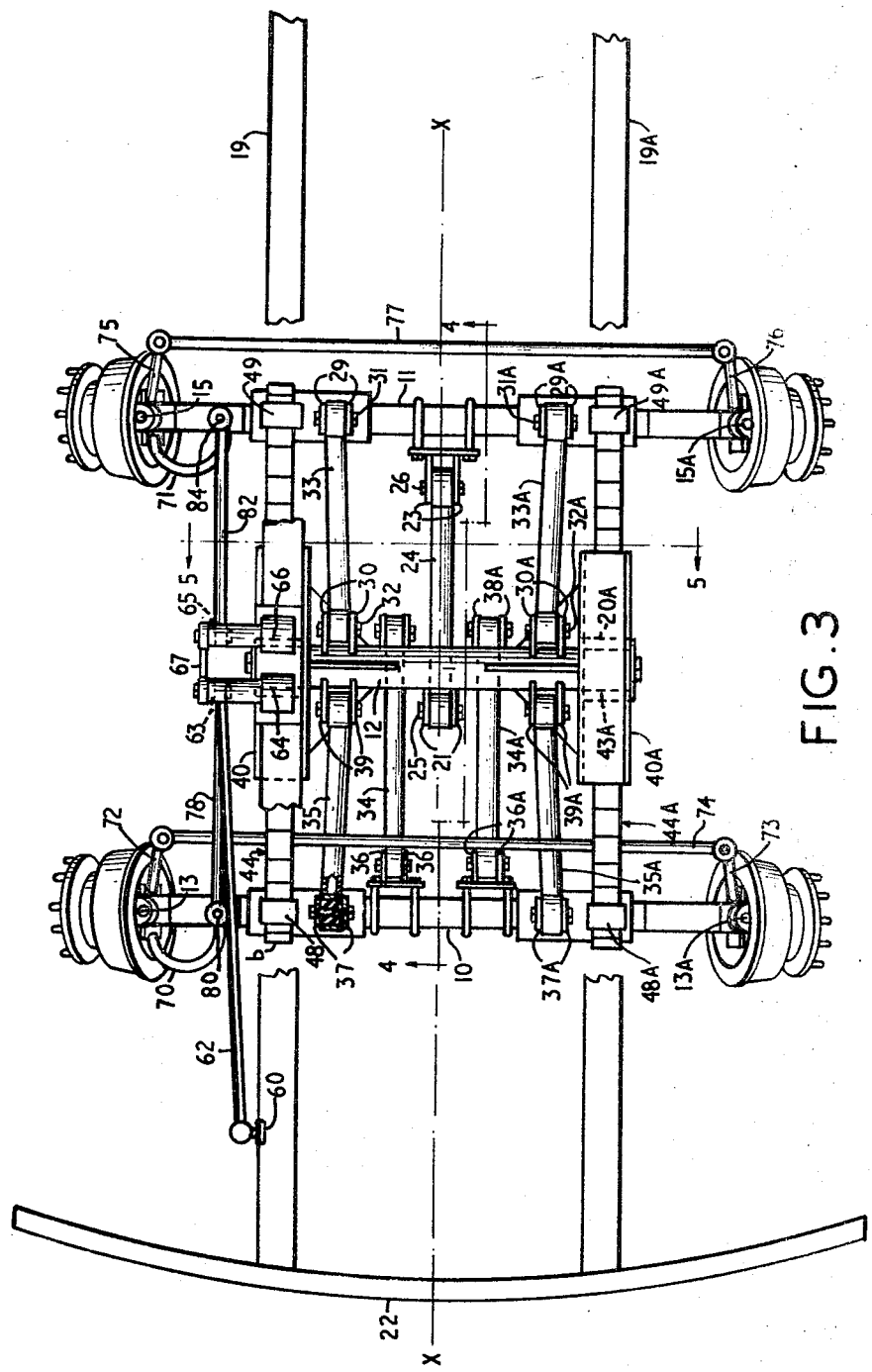
Figure 4:
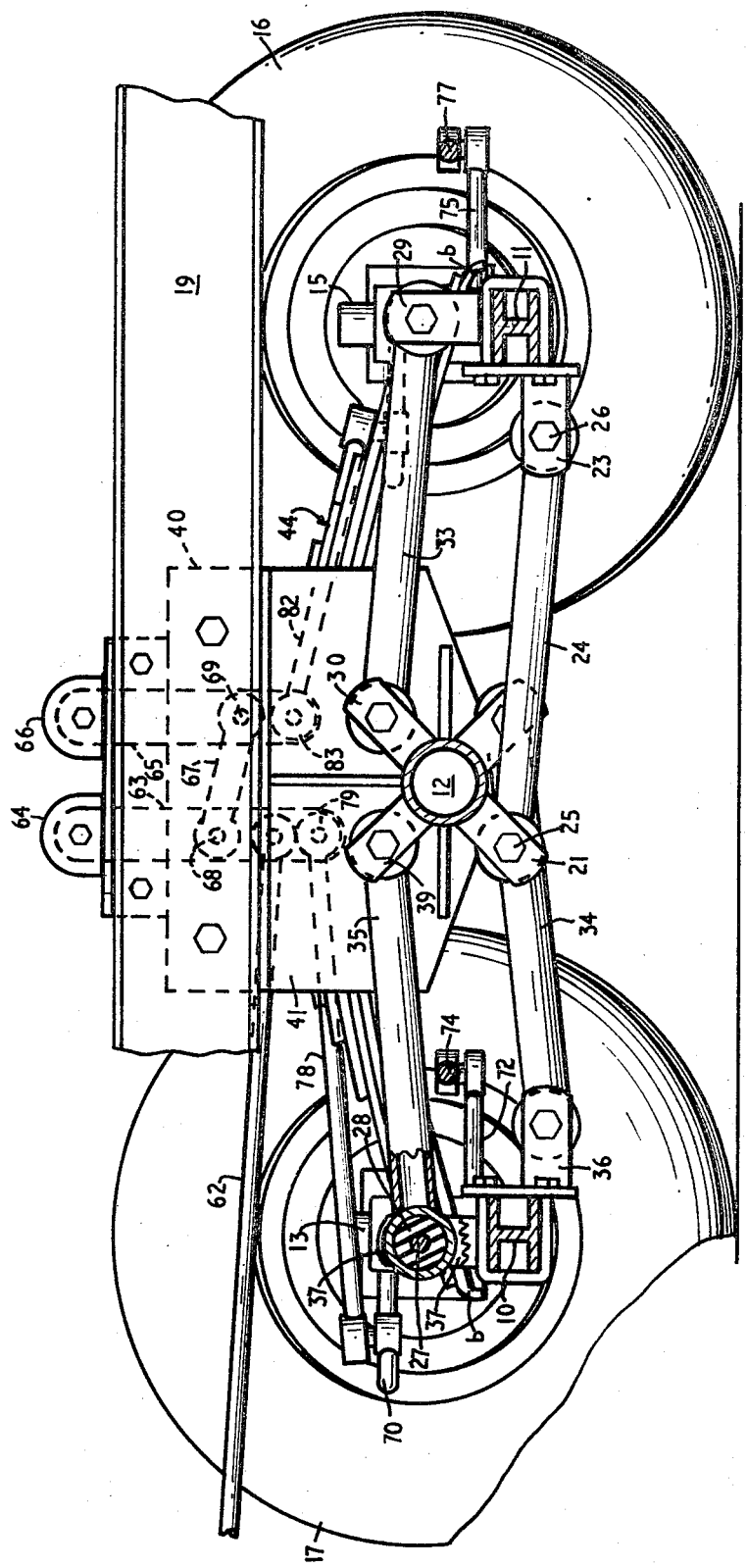
Figure 5:
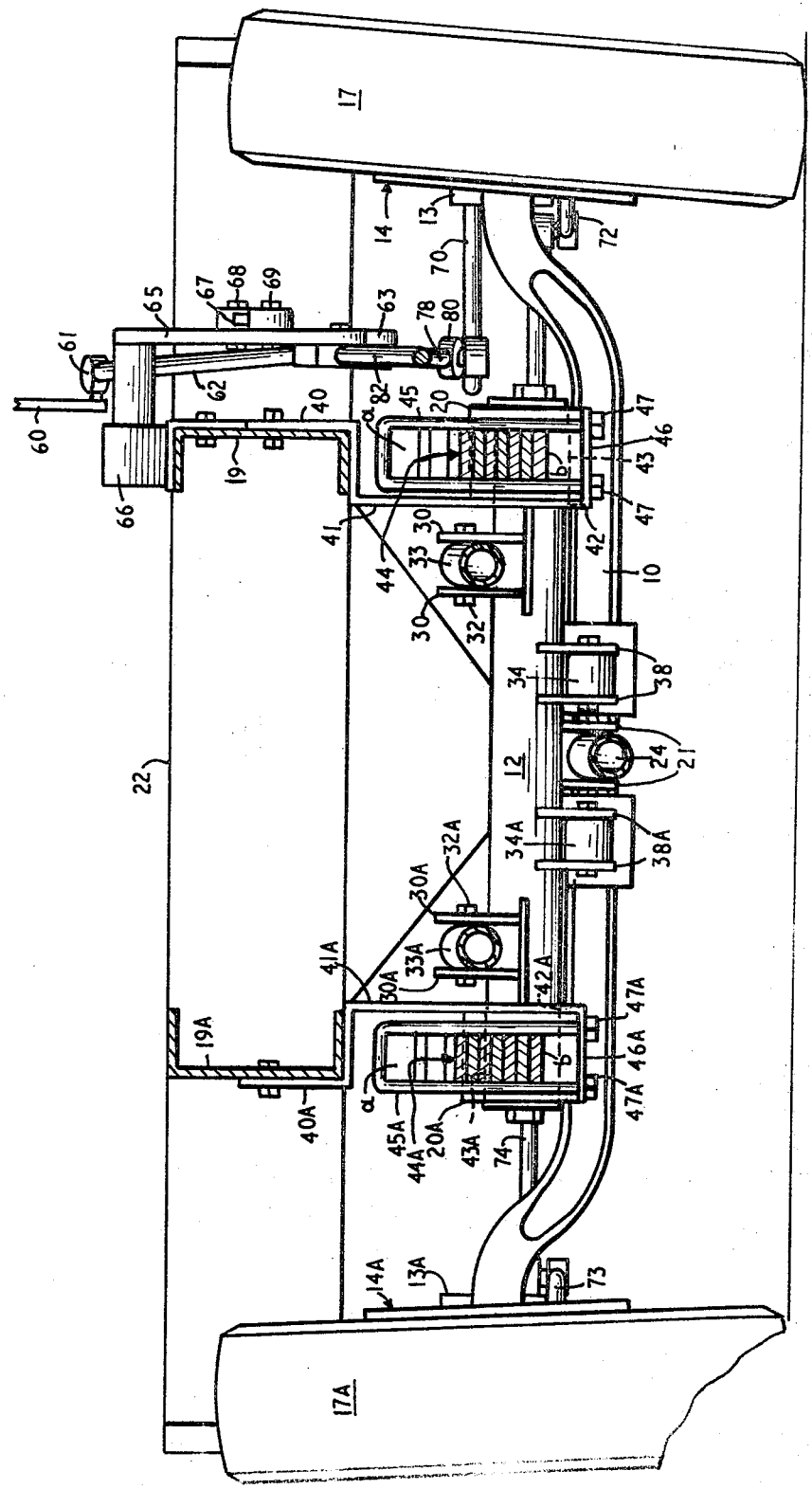

In order to more particularly describe the invention reference is made to the accompanying drawings which by way of example only illustrate a specific embodiment of the invention, and wherein:

FIG. 1 is a perspective view illustrating the front portion of a heavy vehicle fitted with front axle beams according to the invention in a position in which the wheels on the forward axle beam and those on the trailing beam are mutually displaced to a considerable extent, FIG. 2 is a perspective view showing in more detail the axle beams and their suspension from the chassis of a heavy vehicle, and the operative connection of the axle beams with the steering mechanism of the vehicle, FIG. 3 is a plan view of the arrangement shown in FIG. 2, FIG. 4 is a vertical section taken along the line IV—IV of FIG. 3, and FIG. 5 is a transverse section in a vertical plane taken along the line V—V of FIG. 3.

The bogie structure comprising the leading and trailing axles, the trunnion, and the elements which resiliently connect these axles and the trunnion with each other and with a spring—supported bogie mounting, is a system which, if either standing still or travelling along a straight track on an even surface, is symmetrical to the vehicle axis. Inasmuch as its parts are arranged symmetrical relative to the longitudinal bogie axis X—X, they are designated with plain reference numerals (e.g. 14, 15 . . . ) if disposed on one side of said axis, and with the same numerals but indexed "A" (e.g. 14A, 15A . . . ) if on the opposite side of the axis X—X. To avoid congestion of reference characters on the drawings, such symmetrically arranged parts are in some instances referenced on one side only, but their counter-parts, which should be referenced either with a plain numeral, or with an indexed numeral, can in each case readily be identified from the respective symmetrical parts of the system.

In the embodiment shown the bogie structure comprises a leading axle beam 10 which, as may be seen in FIG. 4 consists of an I-beam, a trailing axle beam 11 of the same cross-sectional configuration arranged at a distance behind the axle beam 10, and a suspension axle or trunnion 12 arranged mid-way between the leading and trailing axle beams 10 and 11, and extending parallel thereto. On stub axles 13 and 13A the axle beam 10 carries a pair of leading front wheels 14 and 14A, whereas the trailing axle beam 111 carries on stub axles 15 and 15A the trailing wheels 16 and 16A, respectively, of the bogie structure. As shown in FIG. 1, the hub of each wheel 14, 14A, 16 and 16A carries a single tyre 17, 17A, 18 and 18A, respectively, although for heavy loads double wheels may be provided on both the leading and the trailing axles—or on one of these axle beams only.

The axle beams 10 and 11 may be on the same level relative to the chassis 19, 19A of the vehicle but, as shown in FIG. 4 the axis of the trunnion 12 may be on a level somewhat higher than that of the axle beams 10 and 11. The trunnion 12 is preferably tubular as shown, and it carries at each of its opposite ends a hub 20 and 20A (FIGS. 3 and 5), respectively.

A pair of carrier lugs 21 is provided centrally on the trunnion 12, the lugs 21 projecting angularly downward from the trunnion in a direction towards the vehicle front 22. Another pair of lugs 23 extend forwardly from the central part of the trailing axle 11 (FIGS. 3 and 4), and a torque rod 24 extends, axially in relation to the bogie assembly, between two horizontal pins 25 and 26 mounted, respectively, by the pairs of lugs 21 and 23. Bores in the opposite ends of the torque rod 24 accommodate rubbed or like resilient bushes resiliently supported by the pin 25 and the pin 26, respectively, in the manner described below.

Two additional pairs of lugs 29 and 29A, respectively, project upwardly from the trailing axle beam 11, one pair 29 near the end of the beam 11 which carries the trailing wheel 16 and the other pair 29A near the beam end which carries the wheel 16. Two pairs of carrier lugs 30 and 30A project angularly upward from the trunnion 12 in positions opposite to those of the lugs 29 and 29A, respectively, the pairs of lugs 29 and 30 each carrying a pin 31 and 32, respectively. The pins 31, 32 support a torque rod 33 by means of resilient rubber bushes, in the manner described above for the torque rod 24. Similarly, the pairs of lugs 29A and 30A carry each a pin 31A and 32A respectively, the pins supporting by means of rubber bushes a torque rod 33A. The torque rods 33 and 33A extend substantially parallel to each other, each at the same distance from the torque rod 24.

Four pairs of torque rods 34 and 34A and 35, 35A extend similarly and symmetrically relative to the longitudinal axis X—X of the bogie structure between pairs of lugs 36, 36A and 37, 37A on the leading axle beam 10 and 38, 38A and 39, 39A, respectively, on the suspension axle or trunnion 12. All of the torque rods 34, 35 and 34A, 35A are likewise resiliently supported by pins mounted between the carrier lugs of each pair by bushes made of rubber or like elastomeric material. The manner in which the resilent bushes are arranged on the pins carried by the respective pairs of carrier lugs is illustrated in FIGS. 3 and 4, where 27 is a pin supported by the lugs 37, and 28 is a rubber bush which closely surrounds the pin 27 and is tightly packed into the forward end portion of the torque rod 35.

Wherever required in view of heavier stresses, the pins and bushes may be replaced by shackle bolts.

For mounting the above described assembly or bogie structure in the front portion of the chassis 19, 19A of a vehicle, e.g. of a heavy truck, this chassis is provided on each of its opposite sides with a side carrier or bracket 40, 40A (FIGS. 3, 4 and 5), the side carriers which are preferably crank-shaped in cross-section being secured to the chassis e.g. by bolts and nuts, by rivetting or otherwise, the side carriers extending downwardly from the chassis. Each side carrier is provided in its section 41 or 41A which depends from the chassis 19, 19A, with a hole 42 and 42A, respectively, into which the trunnion 12 is welded, the two holes 42 and 42A being in register with each other, i.e. symmetrical relative to a vertical plane passed through the longitudinal axis X—X. The opposite end portions of the trunnion 12 extend through two holes 42 and 42A and project outwardly therefrom as indicated at 43 and 43A respectively, the outward projecting trunnion extensions 43 and 43A carrying the abovementioned hubs 20 and 20A respectively.

Sets of springs 44 and 44A, preferably of so-called half-elliptic suspension springs are disposed above the projecting end portions 43 and 43A, respectively, of the trunnion 12, the spring sets 44 and 44A being symmetrically arranged relative to a vertical plane through the longitudinal axis X—X.

Each set or packet of springs comprises a plurality of leaf springs the lengths of which decrease progressively from the top to the bottom of each set. In FIGS. 2 and 5, for instance, the shortest leaf spring of each spring packet or set is designated by $a$ and the longest leaf spring at the bottom of each set by $b$. The springs of the two sets are held together by a number of clamps 45 and 45A, respectively, each clamp being constituted, for instance, by a U-bolt secured to a plate 46 and 46A, respectively, which may be welded to, or made in one with the depending portion 41 or 41A of the respective side carrier or bracket. By the U-bolts 45 and 45A and the nuts 47, 47A by means of which the U-bolts are secured to the plates 46 and 46A, respectively, the sets 44 and 44A of the springs are urged forcefully upon the hub 20 and 20A on the end portions 43 and 43A of the trunnion 12, respectively, but are capable of rotation thereon, together with the hubs, through a small angle.

The free ends of the lowermost spring $b$ of each set and those of the next following spring or springs enter guides 48, 48A which stand up from the opposite end portions of the leading axle beam 10, and similar guides 49, 49A which stand up from the opposite end portions of the trailing axle beam 11. Within these upstanding guides the free ends of the springs $b$ overlie pins (not shown) which extend across these guides. Preferably the extremities of the lowermost spring $b$ are turned downwardly, as indicated in FIG. 4, for the purpose of resisting a slipping of these springs from the pins which they overlie, under extreme stress.

The assembly described above, which includes the side carriers 40, 40A, the trunnion 12 with the hubs, the sets of springs 44, 44A, the axle beams and the torque rods, preferably constitutes a unit and this unit can be mounted on the chassis of a vehicle by bolting or otherwise securing these side carriers to the opposite sides of the chassis, it being thus possible to adapt the assembly easily to different types and sizes of chassis.

The torque bar 24 disposed in the axial plane of the vehicle between the trunnion 12 and the trailing axle beam 11, as well as the torque rods or torque bars 33, 34 and 35 arranged at one side of the vehicle between the trunnion 12, the trailing and leading axles respectively as well as their symmetrical counter-parts 33A, 34A and 35A at the opposite side, with respect to the axis X—X, extend all substantially parallel to each other. In their entirety they constitute a system of resilient connections between the trunnion 12, on the one hand, and the leading and trailing axle beams 10 and 11, on the other hand, which in conjunction with the leaf springs 44 and 44A permit an angular displacement of the leading and trailing axle beams 10 and 11, independently of each other, in vertical planes passing through the respective axle beams. The elastic connection between the axle beams 10, 11 with the trunnion 12 by the torque rods, and the flexibility of the mounting of the sets of springs 44 and 44A—via the hubs 20, 20A—on the extremities of the trunnion also allow for a limited angular displacement of these axle beams in a horizontal plane.

In the arrangement shown, which is designed for "Right-Hand Drive" (in use in some British Commonwealth territories including Great Britain, Australia and New Zealand), the steering box of the vehicle is disposed on the right-hand side of the forward end of the vehicle. In FIGS. 2 and 3 the position of the steering box is indicated by that of the drop arm 60 which is capable of displacement in a vertical plane substantially parallel to the vehicle axis X—X. The lower free end 61 of the drop arm 60 is pivotally connected by a connection rod 62 with a swing arm 63 which is pivotably supported by a bearing 64—preferably a ball or roller bearing—which is mounted on the member 19 of the chassis frame 19, 19A. The swing arm 63 is rotatable about an axis which extends transversely, with preference perpendicularly to the longitudinal vehicle axis. A second swing arm 65 is pivotably supported by a second bearing 66—likewise preferably a roller or ball bearing—arranged close to the bearing 64 on the member 19. The arrangement of the bearing 66 is such that also the swing arm 65 can swing about an axis which extends transversely to the longitudinal axis of the vehicle and parallel to the swinging axis of the swing arm 63. The swing arms 63 and 65 are arranged outside the chassis member 19, above or approximately above the set of springs 44, as shown for instance in FIGS. 2, 4 and 5. Normally, i.e. during straight travel of the vehicle, the swing arms 63 and 65 extend both vertically downwardly as shown in the drawings, close to the outer wall surface of the chassis beam 19.

The two swing arms are operatively interconnected by means of a link 67 articulated at 68 to the swing arm 63 and at 69 to the swing arm 65. In the position shown in FIGS. 2 and 4 of the drawing the link 67 is angularly inclined to the chassis, the pivot point 68 being at a level above that of the pivot point 69. It is to be understood, however, that the pivot points 68 and 69 may be at the same level relative to the chassis and that, in other cases, the angular inclination of the link 67 relative to the chassis may be opposite to that shown in the drawings, the selection of the angle depending on the smallest turning circle required for the vehicle to which the assembly according to the invention is to be fitted.

In the construction shown the stub axle 13 at the right-hand end of the leading axle beam 10, which carries the wheel 14, is provided with a steering arm 70. Similarly, the stub axle 15 at the right-hand end of the trailing axle beam 11, which carries the trailing wheel 16, is provided with a steering arm 71. The transfer of the steering movement from the stub axle 13 to the stub axle 13A and the wheel 14A at the opposite end of the leading axle beam 10 is effected via arms 72 and 73 connected wtih the respective stub axles and a track-rod 74 the opposite ends of which are pivotably connected with the arms 72 and 73. Similarly, the transfer of the steering from the stub axle 15 to the stub axle 15A and the wheel 16A at the opposite end of the trailing axle beam 11 is effected via arms 75 and 76 connected with the respective stub axles 15 and 15A and a track-rod 77 the opposite ends of which are pivotably connected with the arms 75 and 76.

A drag link 78, the opposite ends 79 and 80 of which are pivotably connected to the lower end of the forward swing arm 63 and to the steering arm 70, respectively, serves for the transmission of the steering movement from the drop arm 60 of the steering box via the connecting rod 62 and the arm 63 to the leading front wheel 14, and then via the track-rod 74 to the leading front wheel 14A. A second drag link 82, the opposite ends 83 and 84 of which are pivotably connected to the lower end of the rear swing arm 65 and the steering arm 71, respectively, serves for the transmission of the steering movement from the drop arm 60 of the steering box via the connection rod 62, the link 67 and the swing arm 65 to the trailing front wheel 16 and hence via the track-rod 67 to the trailing wheel 16A. The drag links 78 and 82 are of the same length, as shown in FIG. 3. For the sake of clarity the drag links and the steering arms 70, 71 appear distorted in FIGS. 2 and 4.

In order to enable the steering mechanism to adjust itself to any position of the axle beams 10, 11 relative to each other and to the trunnion 12, the rods 62, 78 and 82 should be connected to the drop arm 60 or its functional equivalent and to the swing arms 63, 65, as well as to the steering arms 70 and 71—as the case may be—by ball joints or universal joints. The same applies also to the connections between the track-rod 74 with the arms 72 and 73, and between the track-rod 77 and the arms 75 and 76. The link 67 may likewise be connected by ball joints with the swing arms 63 and 65, although in this case cylindrical or similar pivot pins may be sufficient for a satisfactory operation of the steering mechanism.

I desire it to be understood that I do not wish protection by Letters Patent to be limited to the details as described above and illustrated in the accompanying drawings, as these may be modified in various ways within the scope of the appended claims.

Thus, for instance, the mutual arrangement of the torque rods relative to each other, and to the axles and to the trunnion may be varied as required. Preferably these torque rods are arranged parallel to each other throughout, but some slight angular deviations such as shown in the drawings are admissible.

The number of the leaf springs of each set, their dimensions and strength may likewise be varied to suit different requirements of use. Also the mutual distance between the bearings which support the swing arms, may be adapted to specific requirements.

The track-rods are shown in the drawing as being each arranged behind the adjoining steering axle. If special conditions make it necessary however, one or the other of the track-rods or both track-rods, may be arranged in front of the respective steering axle.

The steering linkage according to the invention, which includes the above described intermediate gearing viz. two substantially parallel swing arms, a link between these two arms, the two drag links which connect the swing arms to the steering arms of the steering mechanism, and the rod which pivotably connects one of the swing arms with the drop arm of the steering box or with its functional equivalent, need not necessarily be used with the above described bogie structure. Alternatively it can be used with advantage also in conjunction with different bogie structures which comprise two mutually spaced axle beams and an intermediate trunnion or suspension axle suitably connected with the vehicle chassis.

I claim:

1. A bogie structure for the front wheels of a road vehicle with a steering mechanism and having a chassis, rear wheels, and two pairs of front wheels, the bogie structure comprising in combination: a leading axle and a trailing axle each with stub axles for a pair of said front wheels at its opposite ends, the stub axles at one side of the bogie structure being each provided with a steering arm for connection with said steering mechanism; a bogie suspension trunnion arranged substantially mid-way between and substantially parallel to said leading and trailing axles; two mountings for rigid attachment of the bogie structure to the opposite sides of the vehicle chassis, said mountings being rigidly secured to said trunnion at opposite sides of said structure; two hubs rotatably mounted on the opposite ends of said trunnion and a set of leaf springs arranged above each hub, each said set being rigidly connected to the hub on which it is arranged and having two end portions which extend forward and rearward respectively in the direction of vehicle travel, the forward extending portion and the rearward extending portion of each set of leaf springs bearing freely and resiliently upon an element rigidly connected, respectively, with said leading axle and with said trailing axle; gearing for the actuation of said steering arms from an operative element of said steering mechanism, said gearing including two substantially parallel swing arms arranged substantially above one end of said trunnion at different distances from said steering arms, each swing arm being pivotally supported by one of two bearings provided on a part of the vehicle structure at the vehicle side at which said steering arms are arranged, two drag links of equal length each of which pivotally connects with two degrees of freedom one of said steering arms with the nearer swing arm, a link which operatively interconnects the two swing arms, and a connecting rod pivotably connected between one of said swing arms and the operative element of said steering mechanism.

2. A bogie structure as claimed in claim 1, and further comprising a plurality of torque rods which connect the said leading axle with the said trunnion and a plurality of torque rods which connect the said trailing axle with the said trunnion, all said torque rods being arranged symmetrically relative to the vertical median plane of the bogie structure and extending substantially parallel to said median plane, the torque rods connecting the trunnion with the leading axle beam and with the trailing axle beam, respectively, being arranged in two planes, viz. in a plane above, and in a plane below a plane which contains the middle axis of said trunnion, on the one hand, and the middle axis of said leading axle beam and of said trailing axle beam respectively, on the other hand.

3. A bogie structure as claimed in claim 2, including pairs of lugs for the resilient connection of said torque rods between the trunnion and the said leading and trailing axle beams, respectively, said pairs being arranged symmetrically relative to said median plane and being provided on the trunnion, on the one hand, and on the leading axle beam and on the trailing axle beam respectively, on the other hand, in such an arrangement that a part of the torque rods for the interconnection of the trunnion and the leading axle beam extends in a plane above, and another part of said torque rods in a plane below the plane which contains the middle axes of the trunnion and of said leading axle beam, whereas a part of the torque rods for the interconnection of the trunnion and the trailing axle beam extends in a plane above, and another part of said torque rods in a plane below the plane which contains the middle axes of the trunnion and of said trailing axle beam.

4. A bogie structure as claimed in claim 3, wherein the connection of the torque rods which extend between the trunnion, on the one hand, and the said leading axle beam and trailing axle beam respectively, on the other hand, is effected by pins passed through bores provided in the opposite end portions of said torque rods, each of said pins being supported by one of said pairs of lugs with a resiliently deformable bush packed tightly around the respective pin and into the bore through which said pin is passed.

5. A bogie structure as claimed in claim 4, wherein the resilient connection of at least one of said torque rods with the trunnion and with an axle beam is effected by shackle bolts.

6. A bogie structure as claimed in claim 1, wherein the link which operatively interconnects the two swing arms extends parallel to the plane defined by the pivotal axes of said swing arms.

7. A bogie structure as claimed in claim 1, wherein the link which operatively interconnects the two swing arms, is angularly inclined to the plane defined by the pivotal axes of said swing arms.

8. A bogie structure as claimed in claim 6, wherein the pivotal axes of said swing arms extend parallel to one another and transversely to the longitudinal axis of the vehicle supported by said bogie structure.

9. A bogie structure as claimed in claim 7, wherein the pivotal axes of said swing arms extend parallel to one another and transversely to the longitudinal axis of the vehicle supported by said bogie structure.

10. A bogie structure as claimed in claim 8, wherein the pivots of said swing arms are supported by bearings mounted on a member of the chassis at the side of the bogie structure which carries the stub axles provided with the steering arms.

11. A bogie structure as claimed in claim 9, wherein the pivots of said swing arms are supported by bearings mounted on a member of the chassis at the side of the bogie structure which carries the stub axles provided with the steering arms.

12. A bogie structure as claimed in claim 2, wherein the link which operatively interconnects the two swing arms extends parallel to the plane defined by the pivotal axes of said swing arms.

13. A bogie structure as claimed in claim 3, wherein the link which operatively interconnects the two swing arms extends parallel to the plane defined by the pivotal axes of said swing arms.

14. A bogie structure as claimed in claim 2, wherein the link which operatively interconnects the two swing arms, is angularly inclined to the plane defined by the pivotal axes of said swing arms.

15. A bogie structure as claimed in claim 3, wherein the link which operatively interconnects the two swing arms, is angularly inclined to the plane defined by the pivotal axes of said swing arms.

16. A bogie structure as claimed in claim 1, wherein the link which operatively interconnects the two swing arms extends parallel to the plane defined by the pivotal axes of said swing arms, the pivotal axes of said swing arms extending parallel to one another and transversely to the longitudinal axis of the vehicle supported by said bogie structure.

17. A bogie structure as claimed in claim 2, wherein the link which operatively interconnects the two swing arms extends parallel to the plane defined by the pivotal axes of said swing arms, the pivotal axes of said swing arms extending parallel to one another and transversely to the longitudinal axis of the vehicle supported by said bogie structure.

18. A bogie structure as claimed in claim 3, wherein the link which operatively interconnects the two swing arms extends parallel to the plane defined by the pivotal axes of said swing arms, the pivotal axes of said swing arms extending parallel to one another and transversely to the longitudinal axis of the vehicle supported by said bogie structure.

19. A bogie structure as claimed in claim 4, wherein the link which operatively interconnects the two swing arms extends parallel to the plane defined by the pivotal axes of said swing arms.

20. A bogie structure as claimed in claim 4, wherein the link which operatively interconnects the two swing arms, is angularly inclined to the plane defined by the pivotal axes of said swing arms.

References Cited

UNITED STATES PATENTS

| | | | |
|---|---|---|---|
| 1,846,553 | 2/1932 | Hirschler | 280—91 |
| 2,638,355 | 5/1953 | Spangler | 280—81.5 |
| 3,002,762 | 10/1961 | Scheel | 280—81.5 |

KENNETH H. BETTS, Primary Examiner

U.S. Cl. X.R.

280—104.5, 91